United States Patent
Symanow et al.

(10) Patent No.: US 11,772,664 B2
(45) Date of Patent: Oct. 3, 2023

(54) VEHICLE LOAD SHEDDING

(71) Applicant: Ford Global Technologies, LLC, Dearborn, MI (US)

(72) Inventors: David A. Symanow, Plymouth, MI (US); Ray C. Siciak, Ann Arbor, MI (US); Dhanunjay Vejalla, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 478 days.

(21) Appl. No.: 16/912,895

(22) Filed: Jun. 26, 2020

(65) Prior Publication Data

US 2021/0403010 A1    Dec. 30, 2021

(51) Int. Cl.
*B60W 50/02* (2012.01)
*G07C 5/02* (2006.01)
*B60W 20/13* (2016.01)
*B60W 60/00* (2020.01)

(52) U.S. Cl.
CPC ........ *B60W 50/0205* (2013.01); *B60W 20/13* (2016.01); *B60W 60/0059* (2020.02); *G07C 5/02* (2013.01); *B60W 2510/244* (2013.01); *B60W 2530/00* (2013.01); *B60W 2555/20* (2020.02)

(58) Field of Classification Search
None
See application file for complete search history.

(56) References Cited

U.S. PATENT DOCUMENTS

| | | | |
|---|---|---|---|
| 6,879,895 B2 | 4/2005 | Capps et al. | |
| 6,963,796 B2 | 11/2005 | Larson et al. | |
| 7,421,323 B2 | 9/2008 | Dannenberg et al. | |
| 8,510,200 B2 * | 8/2013 | Pearlman | H04Q 9/00 705/36 R |
| 9,048,689 B2 | 6/2015 | Bosson et al. | |
| 2006/0137643 A1 * | 6/2006 | Thompson | F02N 11/0803 123/179.4 |
| 2007/0159137 A1 * | 7/2007 | Verbrugge | G01R 31/367 320/132 |

(Continued)

FOREIGN PATENT DOCUMENTS

JP        2004142662    *   5/2004

*Primary Examiner* — Christian Chace
*Assistant Examiner* — Scott R Jagolinzer
(74) *Attorney, Agent, or Firm* — Frank A. Mackenzie; Bejin Bieneman PLC (57) ABSTRACT

A system includes a processor and a memory. The memory stores instructions executable by the processor to determine an action for a vehicle based on an identified risk condition, to determine a minimum time for performing the action, and based on data including a vehicle battery state of charge, an outdoor temperature, and a vehicle mode of operation, to determine an available electrical power for performing the action. The instructions further include instructions to determine maximum permissible electrical energy discharge rate based on the minimum time for performing the action and the determined available electrical power, to determine a load control plan for a plurality of electrical devices in the vehicle based on the maximum permissible electrical energy discharge rate, an electrical load status of the vehicle, and load priority data; and to execute the determined load control plan.

20 Claims, 4 Drawing Sheets

(56) References Cited

U.S. PATENT DOCUMENTS

| | | | |
|---|---|---|---|
| 2008/0082345 A1* | 4/2008 | Greiner | G06Q 10/20 |
| | | | 705/305 |
| 2017/0174037 A1* | 6/2017 | Meyhofer | B60H 1/143 |
| 2018/0191197 A1 | 7/2018 | Carr et al. | |
| 2019/0025813 A1* | 1/2019 | Cella | G01M 13/045 |

* cited by examiner

VEHICLE LOAD SHEDDING

BACKGROUND

A vehicle may include an electrical generator for generating electrical energy. The electrical energy can be consumed by electrical devices such as computers, sensors, actuators, etc. The generator may be mechanically coupled to an engine, e.g., an internal combustion engine (ICE), to generate electric power. A vehicle may store electrical power in an energy storage, e.g., a battery. In one example, the battery may be charged by the vehicle's internal combustion engine. In another example, e.g., in an electric vehicle (EV), the battery may be charged by an external electrical power source in a charging station. Under some circumstances, the battery may lack sufficient electrical power to operate vehicle electrical devices, e.g., when the battery of an electric vehicle is not fully charged, an onboard electrical generator is not operational, and/or the battery has a limited amount of stored power to operate the vehicle electrical loads.

DETAILED DESCRIPTION

Introduction

Disclosed herein is a system, comprising a processor and a memory. The memory stores instructions executable by the processor to determine an action for a vehicle based on an identified risk condition, to determine a minimum time for performing the action, based on data including a vehicle battery state of charge, an outdoor temperature, and a vehicle mode of operation, to determine an available electrical power for performing the action, based on the minimum time for performing the action and the determined available electrical power, to determine maximum permissible electrical energy discharge rate, based on the maximum permissible electrical energy discharge rate, an electrical load status of the vehicle, and load priority data, to determine a load control plan for a plurality of electrical devices in the vehicle; and to execute the determined load control plan.

The instructions may further include instructions to determine the electrical load status based on the outdoor temperature and the vehicle mode of operation, and to determine the load control plan further based on the determined electrical load status.

The risk condition may specify plurality of restrictions on one or more of vehicle operations in accordance to one or more of fault conditions.

The instructions may include further instructions to determine the risk condition based at least in part on a plurality of relationships between (i) the risk condition, and (ii) DTCs and a vehicle diagnostic condition.

The instructions may further include instructions to determine a predicted engine idle time based on (i) the determined action and (ii) an idle time duration limit determined based on a vehicle location and map data.

The determined action may include at least one of uploading vehicle data to a remote computer or downloading data from the remote computer, navigating the vehicle to a specified location, actuating a vehicle actuator to perform a specified action.

The instructions may further include instructions to determine the minimum time based on the determined action and stored execution time data for the determined action.

The load control plan may include (i) turning off a device, (ii) reducing power provided to the device, or (iii) transmitting an instruction via a vehicle communication network to the device including maximum allowed power limit of the respective device, wherein the device includes a computer programmed to execute the received instruction to limit a respective power consumption.

The instructions may further include instructions to determine a thermal load threshold for vehicle thermal devices based on the outside temperature, a vehicle interior temperature, a user interior temperature setting, a vehicle sensor temperature, and a specified range for an operation temperature of the vehicle sensor.

The instructions may further include instructions to determine a second power control plan for the vehicle thermal devices based on a thermal load priority list and a second threshold for the vehicle thermal devices.

The instructions may further include instructions to determine a respective priority for each of the plurality of devices based on the load priority data, the vehicle model of operation, and the determined maximum permissible electrical energy discharge rate, and determine the load control plan further based on the respective priorities determined for each of the plurality of devices.

Further disclosed herein is a method, comprising determining an action for a vehicle based on an identified risk condition, determining a minimum time for performing the action, based on data including a vehicle battery state of charge, an outdoor temperature, and a vehicle mode of operation, determining an available electrical power for performing the action, based on the minimum time for performing the action and the determined available electrical power, determining maximum permissible electrical energy discharge rate, based on the maximum permissible electrical energy discharge rate, an electrical load status of the vehicle, and load priority data, determining a load control plan for a plurality of electrical devices in the vehicle, and executing the determined load control plan.

The method may further include determining the electrical load status based on the outdoor temperature and the vehicle mode of operation, and determining the load control plan further based on the determined electrical load status.

The method may further include determining the risk condition based at least in part on a plurality of relationships between (i) the risk condition, and (ii) DTCs and a vehicle diagnostic condition.

The method may further include determining a predicted engine idle time based on (i) the determined action and (ii) an idle time duration limit determined based on a vehicle location and map data.

The determined action may include at least one of uploading vehicle data to a remote computer or downloading data from the remote computer, navigating the vehicle to a specified location, actuating a vehicle actuator to perform a specified action.

The method may further include determining the minimum time based on the determined action and stored execution time data for the determined action.

The load control plan may include (i) turning off a device, (ii) reducing power provided to the device, or (iii) transmitting an instruction via a vehicle communication network to the device including maximum allowed power limit of the respective device, further comprising executing, in the device, the received instruction to limit a respective power consumption.

The method may further include determining a thermal load threshold for vehicle thermal devices based on the outside temperature, a vehicle interior temperature, a user interior temperature setting, a vehicle sensor temperature, and a specified range for an operation temperature of the vehicle sensor.

The method may further include determining a second power control plan for the vehicle thermal devices based on a thermal load priority list and a second threshold for the vehicle thermal devices.

Further disclosed is a computing device programmed to execute any of the above method steps. Yet further disclosed is a vehicle comprising the computing device.

Yet further disclosed is a computer program product, comprising a computer-readable medium storing instructions executable by a computer processor, to execute any of the above method steps.

System Elements

Figure 1:
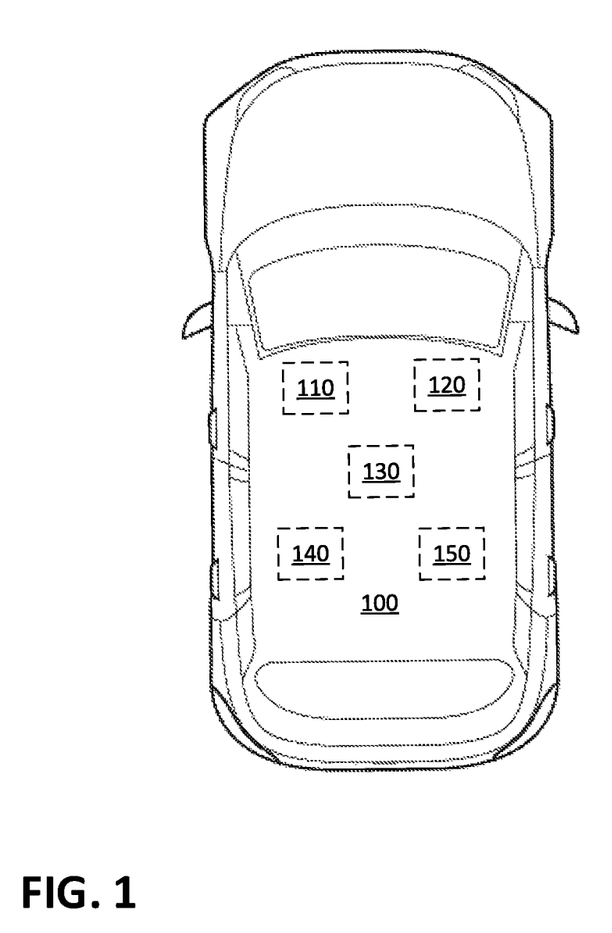
FIG. 1 is a diagram of an exemplary vehicle system.

FIG. 1 is a block diagram of a vehicle 100. The vehicle 100 may be powered in a variety of known ways, e.g., with an electric motor and/or internal combustion engine. The vehicle 100 may include computer(s) 110, actuator(s) 120, sensor(s) 130, an electrical power generator 140, and energy storage(s) 150, each of which are discussed in more detail below. In one example, the vehicle 100 has a hybrid powertrain including an electric motor and an internal combustion engine. In another example, an electric vehicle 100 may lack a power generator.

The vehicle 100 may have multiple modes of operation. A mode of operation, in the present context, specifies a state of operation of (i) a vehicle powertrain and (ii) vehicle electrical devices. Example modes of operation are (i) electrical devices On and engine Off (specific to a vehicle 100 with a combustion engine), (ii) engine Off and electrical devices Off, (iii) engine running in idle, and (iv) vehicle 100 moving, etc. Electrical devices (or devices), in the present context, are components that consume electrical energy.

Electrical devices include but are not limited to vehicle 100 computers 110, actuators 120, sensors 130. Electrical devices are supplied with electrical energy via an electrical connection to a vehicle 100 power distribution bus. A power distribution bus includes electrical conductors, e.g., copper cables, electrically coupling electrical devices with an electrical power source, e.g., energy storage 150. A vehicle 100 may include multiple power distribution buses, e.g., a first bus supplying a supply voltage of 12V DC and a second bus providing a supply voltage of 48V DC. Power consumption of a device may vary (i) based on an operation of the respective device, e.g., operating or not operating, and (ii) based on electrical characteristics or demands of the respective device, e.g., an operating electrical motor may consume more power than a computer 110. Power consumption is typically specified in units of Watts (W). Power consumption is defined based on a current specified in Amperes (A) passing through a device and an electrical voltage (V) of the power distribution bus.

The computer 110 includes a processor and a memory such as are known. The memory includes one or more forms of computer-readable media, and stores instructions executable by the computer 110 for performing various operations, including as disclosed herein.

The computer 110 may include programming to operate one or more of vehicle brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations.

The computer 110 may operate a vehicle 100 in an autonomous, semi-autonomous mode, or a non-autonomous (or manual) mode. For purposes of this disclosure, an autonomous mode is defined as one in which each of vehicle 100 propulsion, braking, and steering are controlled by the computer 110; in a semi-autonomous mode the computer 110 controls one or two of vehicles 100 propulsion, braking, and steering; in a non-autonomous mode a human operator controls each of vehicle 100 propulsion, braking, and steering.

The computer 110 is generally arranged for communications on a vehicle communication network, e.g., including a communication bus such as a controller area network (CAN) or the like. The computer 110 may include or be communicatively coupled to, e.g., via a vehicle communications bus as described further below, more than one processor, e.g., controllers or the like included in the vehicle for monitoring and/or controlling various subsystems such as a powertrain, brake, steering, etc.

Via the vehicle network, the computer 110 may transmit messages to various devices in the vehicle 100 and/or receive messages from the various devices, e.g., controllers, actuators 120, sensors 130, etc. A controller, e.g., a temperature controller, etc., may be configured to perform a specified operation such as controlling temperature. A controller may include a programmable processor and/or a dedicated electronic circuit including an Application-Specific Integrated Circuit (ASIC) that is manufactured for a particular operation, e.g., an ASIC for determining an actuation of an actuator 120 for controlling temperature. In another example, a dedicated electronic circuit may include a Field-Programmable Gate Array (FPGA) which is an integrated circuit manufactured to be configurable by a customer. Typically, a hardware description language such as VHDL (Very High Speed Integrated Circuit Hardware Description Language) is used in electronic design automation to describe digital and mixed-signal systems such as FPGA and ASIC. Alternatively or additionally, in cases where the computer 110 actually comprises multiple devices, the vehicle communication network may be used for communications between devices represented as the computer 110 in this disclosure. Further, as mentioned below, various controllers and/or sensors 130 may provide data to the computer 110 via the vehicle communication network.

In addition, the computer 110 may be configured for communicating through a wireless communication interface with a remote computer 160 via a wireless communication network 170. The communication network may be one or more of wireless communication mechanisms, including any desired combination of wireless (e.g., cellular, wireless, satellite, microwave and radio frequency) communication mechanisms and any desired network topology (or topologies when multiple communication mechanisms are utilized). Exemplary V-to-V communication networks include cellular, Bluetooth, IEEE 802.11, dedicated short range communications (DSRC), and/or wide area networks (WAN), including the Internet, providing data communication services.

The sensors 130 may include a variety of devices such as are known to provide data to the computer 110. For example, the sensors 130 may include Light Detection And Ranging (LIDAR) sensor(s) 130, etc., disposed on a top of the vehicle 100, behind a vehicle 100 front windshield, around the vehicle 100, etc., that provide relative locations, sizes, and shapes of objects surrounding the vehicle 100. As another example, one or more radar sensors 130 fixed to vehicle 100 bumpers may provide data to provide locations of the objects, etc., relative to the location of the vehicle 100. The sensors 130 may further alternatively or additionally include camera sensor(s) 130, e.g. front view, side view, etc., providing images from an area surrounding the vehicle 100.

The vehicle 100 may determine a location, e.g., GPS (Global Positioning System) location coordinates, of the vehicle 100 relative to a coordinate system 270, e.g., based on data received from a vehicle 100 GPS (Global Positioning System) sensor 130. Additionally, the computer 110 may be programmed to determine a direction of the vehicle 100 movement, e.g., based on data received from the GPS sensor 130. The vehicle 1000 may include current sensors 130 determining an electrical current consumed by a vehicle 100 device such as the computer(s) 110, actuator(s) 120, and/or other sensors 130. As another example, the sensors 130 may include an outside temperature sensor 130 providing data including temperature $T_o$ of exterior of the vehicle 100. As another example, a battery sensor 130 may provide data including a battery temperature $T_b$. In yet another example, an interior temperature sensor 130 may provide data including an interior temperature $T_i$ of the vehicle 100 interior.

The actuators 120 typically include circuits, chips, or other electronic components that can actuate various vehicle subsystems in accordance with appropriate control signals as is known. For instance, the actuators 120 may include one or more relays, servomotors, etc. The actuators 120, therefore, may be used to control braking, acceleration, steering, interior lighting, exterior lighting, horn, etc. of the vehicle 100. The actuators 120 may include thermal actuators 120 such as a cooling actuator 120, e.g., interior compartment air-conditioner, a cooling actuator 120 for a vehicle 100 sensor 130, and/or a heating actuator 120, e.g., interior compartment heater. Additionally, actuators 120 may include relays for controlling electrical power supply to computers 110, actuators 120, sensors 130. For example, the computer 110 may actuate a relay actuator 120 to turn on or off vehicle 100 headlights, seat heating components, etc.

The control signals used to control the actuators 120 may be generated by the computer 110, a control unit located in the vehicle 100, e.g., the brake controller, etc. The vehicle 100 may include various components or sub-systems, each including one or more sensors 130, actuators 120, controllers, etc. For example, the vehicle 100 may include a brake component including brake sensors 130, brake actuators 120, and/or other electronic, mechanical, etc. elements that stop the vehicle 100 based on commands received from a controller. As another example, the computer 110 may actuate a sensor cooling actuator 120 to cool a sensor 130 based on a temperature of the sensor 130, cool an interior compartment of the vehicle 100, and/or to heat the interior of the vehicle 100.

The power generator 140 is typically an electrical generator mechanically coupled to a vehicle 100 internal combustion engine. The power generator 140 provides electrical energy to vehicle 100 electrical devices. For example, the power generator 140 output voltage may be 12 VDC (Volt Direct Current) or 48 VDC. The power generator 140 may output electrical energy when the vehicle 100 with a combustion engine operates in the "engine On" mode of operation and may stop outputting electrical energy when the vehicle 100 engine is off.

The power generator 140 may be a starter-generator 140. Thus, to start the vehicle 100, the power generator 140 may output mechanical energy to start the vehicle 100 internal combustion engine, whereas when the vehicle 100 internal combustion engine operates, then the starter-generator 140 operates an electrical generator and outputs electrical energy. In another example, a vehicle 100, e.g., an electric vehicle 100, may lack a power generator 140.

The vehicle 100 energy storage 150 may include one or more rechargeable lithium batteries. The energy storage 150 may store energy received from the power generator 140 and supply the stored energy to the devices, e.g., actuators 120. In the present context, "charging" and "discharging" refer to the energy storage 150 receiving electrical energy from a source such as the power generator 140 and outputting (or supplying) electrical energy to vehicle 100 devices. A state of charge SOC of an energy storage 150 typically specifies an amount of electrical energy stored in the respective energy storage 150. The State of charge (SoC) is a level of charge of an electric battery 150 relative to a capacity of the battery 150. The State of Charge SOC may be specified in percentage, e.g., 0% (zero) means empty, 100% means full. Capacity of an energy storage 150 may be specified in ampere-hour (Amph).

The computer 110 may be programmed, using a conventional electrochemical battery model, to determine the State of Charge SOC of the energy storage 150 based on a duration of discharge time, e.g., 10 minutes, a discharge rate, e.g., 100 W, and the battery temperature $T_b$, e.g., 50 degrees Celsius. In one example, the computer 110 may be programmed based on Equation (1) to determine the State of Charge of the energy storage 150. $C_n$ represents a discharge current during n hours of discharging, and i represents the capacity of the energy storage 150. $SOC_0$ represents the capacity of the energy storage 150.

$$SOC = SOC_0 - \frac{\int i dt}{C_n} \qquad (1)$$

Available electrical energy $P_a$ in the energy storage 150, e.g., a battery, may be determined based on battery temperature $T_b$, the battery State of Charge SOC, and a discharge rate of the battery. Table 1 shows an example set of data showing relationships between (i) the battery available energy $P_a$ and (ii) the battery State of Charge SOC and battery temperature $T_b$. For example, with reference to Table 1, the battery available energy $P_a$ at State of Charge SOC of 95% and the battery temperature $T_b$ of 50 degrees Celsius is 100%, whereas the available energy $P_a$ reduces as the battery temperature $T_b$ reduces, e.g., an available energy $P_a$ of 36% when the temperature $T_b$ reaches −30 degrees Celsius.

TABLE 1

| Battery | SOC % | | | |
|---|---|---|---|---|
| temperature | 95% | 70% | 60% | 40% |
| 50 C. | 100% | 95% | 93% | 89% |
| 25 C. | 92% | 87% | 85% | 81% |
| 10 C. | 80% | 75% | 73% | 70% |
| 0 C. | 65% | 55% | 52% | 50% |

TABLE 1-continued

| Battery temperature | SOC % | | | |
|---|---|---|---|---|
| | 95% | 70% | 60% | 40% |
| −10 C. | 52% | 44% | 43% | 39% |
| −30 C. | 36% | 32% | 30% | 27% |

In one example, the computer 110 may be programmed to determine an output (or discharged) energy $P_d$ (e.g., specified in percentage of battery storage capacity) from a charged battery over a discharge time td, e.g., specified in minutes, based on Equation (2). Equation (2) specifies output energy from a battery storage 150 that is being discharged. SOC represents the State of Charge of the energy storage 150. $d_r$ represents a discharge rate of the battery. In the present context, a positive discharge rate $d_r$ specifies a condition in which the battery is discharged and a negative discharge rate $d_r$ may specify a condition in which the storage 150 is charged, e.g., by the generator 140. Operation $f_1$ may be determined using conventional battery modeling techniques.

$$P_d = f1(T_b, SOC, d_r, t_d) \qquad (2)$$

As discussed above, based on the mode of operation of the vehicle 100, the vehicle 100 power generator 140 may generate electrical energy. For example, the generator 140 of a vehicle 100 with an internal combustion engine in an idle mode of operation or moving mode of operation may generate electrical power. In one example, the vehicle 100 may operate for 2 minutes in idle mode, i.e., the generator 140 generating electrical power, but then operate for 5 minutes in "engine Off devices On" mode. The computer 110 may be programmed, based on Equation (3), to determine the output energy $P_d$ based on the battery temperature $T_b$, battery state of charge SOC, a first discharge rate $d_{r1}$ during vehicle 100 mode of operation allowing generator 140 to generate electrical energy (this rate may be negative as discussed above), a second discharge rate $d_{r2}$ during vehicle 100 mode of operation with no generator 140 operation, and discharge time $t_d$.

$$P_d = f2(T_b, SOC, d_{r1}, d_{r2}, t_d) \qquad (3)$$

Figure 2:
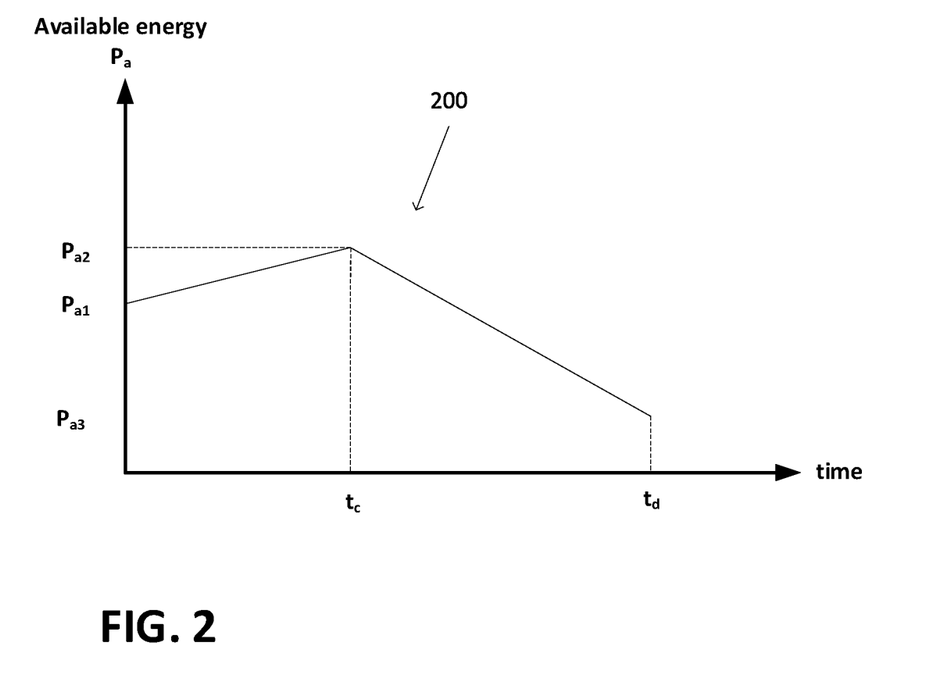
FIG. 2 is an exemplary graph showing a change of available energy of a battery over time.

FIG. 2 is a graph 200 illustrating an example scenario in which the battery storage 150 has an initial available power $P_{a1}$ at time 0 (zero). The electrical devices discharge the battery storage 150 for a time $t_d$, although for a time to the generator 140 is generating electrical energy, e.g., in an engine idle mode of operation while devices consume electrical power (resulting in an increase of energy to the available energy $P_{a2}$). The discharge rate $d_{r1}$ may be negative, i.e., indicating that amount of power produced by the generator 140 during this time exceeds the amount of electrical energy being consumed by the devices. Then the mode of operation of the vehicle 100 changes to a mode of operation with no generator 140 operation, e.g., engine off devices on (resulting in reduction of energy to available energy $P_{a3}$ at the time $t_d$. Operation $f_2$ may be determined using conventional battery modeling techniques, e.g., predictive Kalman filter models, based on electrochemistry of batteries and batteries characteristics developed by battery manufacturer.

As discussed below, the computer 110 may be programmed to operate vehicle 100 devices in a vehicle 100 mode without operation of the generator 140, e.g., "engine off and devices on" mode of operation, e.g., to perform a specified action upon detecting a fault of one or more vehicle 100 devices, systems, etc.

A vehicle 100 component, e.g., an actuator 120, a sensor 130, an electronic controller included in a component, etc., may have a fault. A fault is a condition in which a component fails to operate, or operates outside of one or more predefined parameters, e.g., a predefined parameter could be a physical quantity such as temperature, torque, revolutions per minute, pressure, etc. Thus, operating outside a predefined parameter could include the vehicle 100 and/or a component thereof not operating, operating above, and/or operating below a specified value or range, e.g., above a specified wheel speed, outside a specified temperature range, etc. The vehicle 100 computer 110 may be programmed to determine whether a vehicle 100 component, e.g., propulsion, braking, steering, etc., is in a fault condition based on data received from, e.g., various vehicle 100 sensors 130, actuators 120, controllers, etc. For example, a fault can be determined by a diagnostic operation, i.e., the computer 110 may be programmed to monitor a vehicle 100 component and determine whether a fault condition has occurred, e.g., whether a physical quantity is outside a predefined range.

The computer 110 and/or controllers may periodically communicate with one another. For example, a brake controller may periodically transmit a status message including operating information of the brake controller to the computer 110. A failure to receive a periodic message may be identified as a fault condition in a vehicle 100. The computer 110 may be programmed to determine whether an expected message from, e.g., a controller, a second computer 110, etc., is missing, i.e., has not been received, upon determining that the message was not received within expected time, e.g., 100 milliseconds (ms), since activating a vehicle 100 ignition, and/or since previously received message. Upon determining that a message from, e.g., a brake controller, is missing, the computer 110 may store a DTC (Diagnostic Trouble Code), e.g., labeled "no communication with the brake controller," in a computer 110 memory.

In one example, during operation of the vehicle 100 in an autonomous mode, the computer 110 may be programmed to actuate one or more controllers to transmit the diagnostic data periodically and/or upon a determined change, e.g., of a DTC status from an inactive state to an active state. This process is sometimes referred to as "polling." Thus, advantageously, a time to detect a fault condition in the vehicle 100 computer 110 may be reduced compared to only periodic transmission of diagnostic data, e.g., DTC status.

The computer 110 and/or any of vehicle 100 controllers may be programmed to perform a diagnostic operation by verifying whether a fault condition is met. For example, a minimum output torque may be expected from an engine after the engine reaches a threshold temperature. The fault condition may, to name one example, be "the engine torque output is less than the expected torque threshold." The diagnostic operation may further include updating a diagnostic status upon determining that a fault condition is met and/or a previously met fault condition is resolved, i.e., the fault condition does not exist anymore, e.g., a deficient vehicle 100 part was replaced.

The diagnostic operation may further include storing the diagnostic status, e.g., in a computer 110 memory. Each diagnostic operation may be identified by a diagnostic trouble code (DTC) which is typically a unique numeric code specifying a particular fault condition that the computer 110 may receive via a vehicle 100 network such as a Controller Area Network (CAN communications bus. It is to be understood that DTCs are discussed herein by way of example and not a limitation; other fault identifiers or descriptors could be used in the context of the present disclosure. A vehicle 100 computer 110 may be programmed to perform various diagnostic operations associated with various vehicle 100 components. A status of a DTC typically includes one of "active", or "inactive." "Active" means the DTC is stored. "Inactive" means the DTC is not stored (e.g., no deficiency was determined or a previously stored deficiency was erased from the computer 110 memory), whereas "inactive but previously stored" means a deficiency was determined and stored, although currently the deficiency is not active. The computer 110 and/or a controller may be programmed to update and store a diagnostic status associated with each of the diagnostic operations in a computer 110 memory and/or transmit the diagnostic status via the vehicle 100 communication network to another computer, e.g., a diagnostic tester. Each DTC typically identifies a fault condition of a specific vehicle 100 component, e.g., associated with vehicle 100 propulsion, steering, braking, etc.

As discussed above, the computer 110 may be programmed to perform various diagnostic operations (e.g., resulting in setting a status of one or more DTCs), each associated with one or more of vehicle 100 components and/or operations. A diagnostic condition may be specified based on a specific vehicle 100 component. For example, each of the controllers may be programmed to perform diagnostic operation(s) associated with the operation of the respective controller. The computer 110 may be programmed to receive status data of DTCs from the controllers, e.g., via the vehicle 100 communication network.

As discussed above, a fault condition may impair and/or prevent a vehicle 100 operation and/or a controller operation. The vehicle 100 computer 110, a remote computer 160, and/or a combination thereof, can be programmed to identify a risk condition based on a diagnostic trouble code (DTC) and an diagnostic condition in the vehicle 100, to determine one or more actions for the vehicle 100 based on the identified risk condition, and to operate the vehicle 100 based on the identified action.

In the present disclosure, a "diagnostic condition" is a set of a plurality of data that specifies vehicle 100 physical parameters or states, e.g., one or more of speed, acceleration, yaw rate, vibration, vehicle 100 mode of operation, etc., and possibly also data pertaining to an environment in which a vehicle 100 is operating, such as weather data including precipitation rate, outside temperature, road surface condition, etc., and/or vehicle 100 route data such as topography data such as road elevation, road slope, etc. In one example, the vehicle 100 computer 110 may receive data pertaining to a vehicle 100 operation condition from the vehicle 100 sensors 130, e.g., a speed sensor 130, a camera sensor 130, an acceleration sensor 130, etc., and/or the remote computer 160. The vehicle 100 computer 110 may be programmed to transmit diagnostic condition data, e.g., the vehicle 100 sensor 130 data, via a wireless communication network 170 to the remote computer 160.

A risk condition or a "minimal risk condition" (MRC) specifies a plurality of one or more restrictions on one or more of vehicle 100 operations in accordance to one or more of fault conditions, e.g., DTCs with currently active status, DTCs previously with active status, etc., and/or a vehicle 100 operation condition, e.g., low fuel condition. In other words, an MRC specifies what measure(s) should be applied in order to contain or minimize a risk that can result from a fault condition in the vehicle 100. A risk may for example include a likelihood of a vehicle 100 impact with another vehicle, a likelihood of a loss of control over vehicle 100 operation, e.g., a risk of brake failure, etc. A restriction on vehicle operation in the present context typically includes at least one of (i) limiting a range of a value associated with a physical attribute of the vehicle 100, e.g., limiting vehicle 100 speed to less than 30 kilometers per hour (kph), (ii) enabling, disabling, and/or configuring a vehicle 100 operating mode, e.g., disabling a vehicle 100 autonomous mode, and (iii) applying limitations on vehicle 100 routing, e.g., geofencing, rerouting, pulling over to a roadside, etc. Each of these possible vehicle operating restrictions are discussed below with respect to Tables 1-2.

An MRC may be identified by an identifier, e.g., "$MRC_1$", "$MRC_2$", "$MRC_3$", and "$MRC_4$," as shown in Table 3. A fault condition, e.g., an active DTC, may make one or more vehicle 100 operations impaired or unavailable. Thus, an MRC may be identified based on available vehicle 100 operation(s). Table 3 shows an example association of available vehicle 100 operation(s) for respective MRCs. A fault condition severity may specify to what extent a fault condition impairs (or makes unavailable) vehicle 100 operation(s). The fault severity may be determined in an example scale of "low", "medium", and "high." For example, when under a fault condition, vehicle 100 propulsion, steering, and/or braking are available, then the fault condition severity is classified as "low." For example, when a fault condition causes a loss of propulsion, but steering and braking are available, the severity is classified as "medium," whereas when both propulsion and steering are unavailable, the severity is classified as "high." Additionally or alternatively, a fault condition severity may be classified in a numeric unit such as a percentage, e.g., 0% (zero) as lowest severity and 100% as a highest severity level and/or defined with other associations to available vehicle 100 operation(s).

Table 2 shows example MRCs ($MRC_1$, $MRC_2$, $MRC_3$, and $MRC_4$) associated with each of the example fault condition severity levels just described. As discussed above, each MRC imposes restrictions to vehicle 100 operations and/or additional actions, e.g., data collection, indication to other road users, etc. $MRC_1$ is associated with fault condition(s), in which basic vehicle 100 operation to navigate a vehicle 100, e.g., propulsion, braking, and/or steering, are available. It is to be understood that MRCs are discussed herein by way of example and not limitation; other identifiers or descriptors could be used in the context of the present disclosure. Table 2 shows examples of different fault conditions associated with each MRC. For example, a multimedia fault condition which does not impair any of vehicle 100 propulsion, steering, braking, and lighting, may be associated to $MRC_1$. As another example, $MRC_4$ (low flow fuel condition) imposes restriction of navigating to a gas station to refuel and also a minimum amount of power in the vehicle 100 battery 150 to ensure the engine can be restarted after refueling is complete.

TABLE 2

|  | $MRC_1$ | $MRC_2$ | $MRC_3$ | $MRC_4$ |
|---|---|---|---|---|
| Minimum time $t_{min}$ to address MRC | Upon return to terminal | 120 seconds | 20 seconds | 30 minutes |
| Fault condition severity | Low | Medium | High | High |

TABLE 2-continued

| | MRC$_1$ | MRC$_2$ | MRC$_3$ | MRC$_4$ |
|---|---|---|---|---|
| Available vehicle operations | Propulsion Braking Steering Lighting | Braking Steering Hazard lights Signal lights | Braking (partial) Hazard lights Upload diagnostic data to remote computer | Propulsion Braking Steering Lighting |
| Restrictions | Routing to terminal upon completion of current trip Potentially limiting Speed and/or acceleration Data collection | Navigation to nearest side of the road to stop Data collection | Stop at current lane Data collection | Routing to nearest gas station/charging station ensure battery has available power to start engine after refueling |
| Example | Multimedia fault condition | Loss of propulsion operation | Loss of steering operation | Loss of vehicle operation |

In the present context, an MRC may be recoverable or unrecoverable. A recoverable MRC is an MRC that won't result in any restriction in availability of electrical power for operating the vehicle 100 devices. An example of a recoverable MRC is a dirty sensor 130 which may result in temporarily stopping the vehicle 100 and actuating a vehicle 100 spray actuator 120 to spray the sensor 130 to clean. An unrecoverable MRC is an MRC that results in a restriction of vehicle 100 operation, e.g., MRCs listed in Table 2.

As shown in Table 2, each MRC can be associated with a minimum time $t_{min}$ to address the respective MRC. The minimum time $t_{min}$ to perform the action(s) is a time threshold for performing the actions (instructions) specified based on a MRC after the MRC is identified based on the detected fault condition (Table 2). The computer 110 may be programmed to determine the minimum time $t_{min}$ to address the risk condition based on the identified risk condition, e.g., specified in an example Table 3 stored in the computer 110 memory. In other words, the computer 110 may be programmed to determine the minimum time $t_{min}$ based on the determined action and stored execution time data for the determined action, e.g., 10 seconds for uploading vehicle 100 diagnostics data to a remote computer.

Table 2 shows example restrictions associated with each of the MRCs. As discussed below with reference to Table 3, the vehicle 100 computer 110 and/or the remote computer 160 may be programmed to operate the vehicle 100 based on the MRCs, i.e., based on the restrictions imposed by the associated MRC.

TABLE 3

| No | Fault condition | Vehicle diagnostic condition | Associated MRC |
|---|---|---|---|
| 1 | Steering controller fault condition | None | MRC$_3$ |
| 2 | Loss of anti-lock braking system operation | Temperature >7 degrees Celsius | MRC$_2$ |
| 3 | Loss of anti-lock braking system operation | Temperature <7 degrees Celsius or slippery road condition detected | MRC$_3$ |
| 4 | Brake signal plausibility fault | None | MRC$_1$ |
| 5 | Taillight malfunction | None | MRC$_1$ |
| 6 | Fuel level below a minimum fuel level threshold | None | MRC$_4$ |

Table 3 shows an example set of determined fault conditions in the vehicle 100. The computer 110 may be programmed to determine the MRCs based on determined fault conditions, e.g., data such as shown in Table 3, including a plurality of relationships between (i) the MRCs, and (ii) the fault condition (e.g., DTC) and the vehicle 100 diagnostic condition. With reference to example number 1 of Table 3, the computer 110 may be programmed to detect a steering controller fault condition, e.g., determined based on a steering controller DTC, which results in a loss of vehicle 100 steering operation while propulsion and braking operation are available. Thus, the computer 110 may be programmed to determine the MRC$_3$ based on the determined fault condition. The computer 110 may then determine restrictions associated with MRC$_3$ based on data stored in Table 2. Additionally, the computer 110 may be programmed to determine an MRC at least in part based on the vehicle 100 mode of operation.

As discussed above, the vehicle 100 diagnostic conditions may include vehicle 100 sensor 130 data, data received from the remote computer, e.g., weather data, etc. The computer 110 may be programmed to determine the MRC based on the vehicle 100 diagnostic condition and vehicle operating thresholds, e.g., a temperature threshold, a speed threshold, and/or an acceleration threshold. For example, with reference to example 2 of Table 3, the computer 110 may be programmed to determine MRC$_2$ based on the detected fault condition of an anti-lock braking system (ABS) and an outside temperature exceeding 7 degrees Celsius, whereas, referring to example 3, the computer 110 may be programmed to determine MRC$_3$ based on a same detected fault and a detected slippery road condition, e.g., based on vehicle 100 camera sensor 130 data. Examples 4 and 5 of Table 3 shows other examples of fault conditions which are associated with MRC$_1$ without considering vehicle 100 diagnostic conditions.

With reference to FIG. 1, the computer 110, the remote computer 160 communicating with the computer 110, or a combination thereof may be programmed to identify an MRC. In the present disclosure, any programming discussed may be executable by the computer 110, the remote computer 160, and/or a combination thereof. The computer 110 may be programmed to identify one or more instructions based on the identified MRCs and to perform one or more actions based on the identified instructions. In one example, the remote computer 160 may be programmed to identify the instruction(s) and the computer 110 may be programmed to receive the instructions from the remote computer 160 and execute the actions based on the received instructions, e.g., actuating one or more vehicle 100 actuators 120. For example, the remote computer 160 may be programmed to receive information from another remote computer indicating a cybersecurity attack, to determine instructions based on the received information, and to transmit instructions to the vehicle 100.

As discussed above with reference to Table 1, a minimum time $t_{min}$ may be determined to address each MRC, e.g., 20 seconds for $MRC_3$. Thus, the identified instructions may be at least in part based on the minimum time $t_{min}$ to address the identified MRC. The computer 110 may be programmed to plan a vehicle 100 route to a service station, e.g., for a repair, to cancel a next trip of the vehicle 100, to navigate the vehicle 100 to a nearest roadside, and/or to stop the vehicle 100 in a current lane, to upload vehicle 100 diagnostics data to a remote computer. In one example, the computer 110 may be programmed to determine an instruction to stop the vehicle 100 in lane upon identifying a minimum time $t_{min}$, e.g., 20 seconds. In another example, the computer 110 may be programmed to navigate the vehicle 100 to a specified location, e.g., a road shoulder, to actuate a vehicle 100 actuator 120 to perform a specified action, e.g., uploading diagnostic data to a remote computer.

In another example, the computer 110 may be programmed to identify an instruction to navigate the vehicle 100 to a nearest side of the road and stop the vehicle 100 upon arriving on the side of the road and upload the vehicle diagnostics data based on a minimum time $t_{min}$, e.g., 120 seconds, to address an $MRC_2$.

A vehicle 100 may have multiple fault conditions simultaneously. The computer 110 may be programmed to update the MRC of the vehicle 100 based on detecting a second DTC, and to update the instruction based on the updated MRC. The computer 110 may be programmed to update the MRC by identifying an MRC associated with each of the DTCs and to select the MRC associated with a higher severity. For example, upon detecting a second DTC which results in $MRC_3$ while a first DTC resulted in $MRC_2$, the computer 110 may be programmed to update the MRC associated with the vehicle to $MRC_3$. In another example, upon detecting a second DTC which results in $MRC_2$ while a first DTC resulted in $MRC_3$, the computer 110 may be programmed to maintain the MRC associated with the vehicle at $MRC_3$.

The computer 110 may be programmed to determine an updated minimum time $t_{min}$ to address the MRC such that the updated minimum time $t_{min}$ to address the risk condition is a lowest of a first minimum time $t_{min}$ to address the risk condition associated with a first DTC and a second minimum time $t_{min}$ to address the risk condition associated with the second DTC. For example, an $MRC_4$ may have a first minimum time $t_{min}$ of 30 minutes to refuel the vehicle 100, whereas a brake related MRC may have a second minimum time $t_{min}$ of 10 seconds to stop the vehicle 100 on a roadside and upload the diagnostic data. In such scenario, the computer 110 may be programmed the minimum time $t_{min}$ of 10 seconds (minimum of 10 seconds and 30 minutes).

To perform the identified instruction (action) within the minimum time $t_{min}$, the computer 110 actuates vehicle 100 actuators 120, communicates with vehicle 100 sensors 130, other computers, e.g., a remote computer, etc., within the minimum time $t_{min}$, as discussed above. The vehicle generator 140 and/or power storage 150, e.g., one or more vehicle 100 batteries, should provide electrical energy for at least the minimum time $t_{min}$ to complete the identified actions, e.g., to upload the vehicle 100 diagnostics data to a remote computer.

However, the vehicle 100 battery 150 may lack sufficient electrical energy to complete the actions identified based on an MRC. Thus, as disclosed herein, the computer 110 may be programmed to manage consumption of electrical power such that available electrical energy $P_a$ is provided to complete the identified action(s), e.g., navigating the vehicle 100 to a side of the road, stopping the engine, and uploading the vehicle 100 diagnostics data to a remote computer.

In one example, the computer 110 can be programmed to determine an action for a vehicle based on an identified risk condition (MRC) and to determine a minimum time $t_{min}$ for performing the action(s). The computer 110 can be programmed to determine an available electrical power $P_a$ for performing the action based on data including a vehicle 100 battery 150 state of charge SOC, an outdoor temperature $T_o$, and a vehicle 100 mode of operation. The computer 110 can be programmed to determine maximum permissible electrical energy discharge rate $d_{rmax}$ based on the minimum time $t_{min}$ for performing the action and the determined available electrical power $P_a$. The computer 110 can be programmed to determine a load control plan for a plurality of electrical devices in the vehicle 100 based on the maximum permissible electrical energy discharge rate $d_{rmax}$, an electrical load status of the vehicle 100, and stored load priority data, e.g., a load priority table, and to execute the determined load control plan.

In the present context, a "load control plan" includes data, e.g., in form of a table or the like, specifying (i) devices in the vehicle 100 which are turned on, (ii) devices in the vehicle 100 which should be turned off, and/or (iii) devices that are partially powered, i.e., a limited amount of electrical power is supplied to the respective device. In the present context, "partially powered" means reducing power provided to a device, e.g., by transmitting an instruction via a vehicle 100 communication network to the device including a maximum amount of power that the respective device is allowed to consume (i.e., a maximum allowed power limit). The respective device may include a computer programmed to then execute the received instruction to limit the power consumption of the device, e.g., by limiting a speed of a motor included in the device.

A "load priority table," in the present context, includes data specifying a priority of each device (or group of devices) in the vehicle 100 with respect to providing electrical power. A load priority table may include priorities specified in a range, e.g., high, medium, low. In one example, a priority of supplying electrical energy to the brake controller for a vehicle 100 in moving mode is specified as "high," whereas a priority of window opener controller and actuator 120 is specified as "low."

A "load L" (or electrical load status), in the present context, is an amount of electrical power consumed by one or more electrical consumers, e.g., vehicle 100 devices. An "electrical load status," may be specified in form of a discharge rate, e.g., in units of Amperes (A), or consumed power, e.g., in units of Watts (W), etc. Additionally, the load status may include information specifying a load status of each device or group of devices in the vehicle 100, e.g., whether each device is turned on or off. For example, the load status may be specified in form of a table specifying in each row a load of a device (or group of devices), and further specify a total load of all devices electrically coupled to the battery storage 150 and/or generator 140. Data pertaining to a load status, load priority table, and load control plan may be stored in a computer 110 memory. Alternatively, a load status may be specified in a percentage of nominal load. A nominal load may be specified for operating vehicle 100 devices under a specified condition, e.g., specific temperature, etc.

In the present context, a maximum permissible electrical energy discharge rate $d_{rmax}$ is a discharge rate that allows the vehicle 100 electrical energy provided by the generator 140 and/or storage 150 to operate the vehicle 100 electrical devices for at least the minimum time $t_{min}$ to perform actions determined based at least in part of an identified MRC. The maximum permissible electrical energy discharge rate $d_{rmax}$ may be determined using an example Equation (4), as discussed below. In the present context, "allows to operate the vehicle" means at least enough electrical energy is available to complete the determined action(s). In one example, the maximum permissible electrical energy discharge rate $d_{rmax}$ may be specified as a percentage of nominal discharge rate, e.g., 80%, or in Watts (W), etc.

The computer 110 can be programmed to determine the maximum permissible electrical energy discharge rate $d_{rmax}$ based on the minimum time $t_{min}$ for performing the action and the determined available electrical power $P_a$. The computer 110 may be programmed based on example Equation (4) below to determine the maximum permissible electrical energy discharge rate $d_{rmax}$. Operation $f_3$ may be determined using conventional battery modeling techniques. With reference to example Equation (4), the computer 110 may be programmed to determine the maximum permissible discharge rate $d_{rmax}$ based on the battery temperature $T_b$, battery state of charge SOC, available energy $P_a$, charge time $t_c$, and the minimum time $t_{min}$. Additionally or alternatively, a battery 150 manufacturer, etc., may determine an equation specific to the battery 150 based on test data and/or analytical techniques.

$$d_{rmax} = f_3(T_b, SOC, P_a, t_c, t_{min}) \quad (4)$$

In one example, the computer 110, with reference to $MRC_3$ in Table 2 and FIG. 2, may determine a minimum time $t_{min}$ of 20 seconds. The computer 110 may determine a charge time $t_e$ of 5 seconds based on planning to navigate the vehicle 100 to a road shoulder and then stop the engine, resulting in stopping operation of the vehicle 100 generator 140. Therefore, from the time 0 (zero) to the time $t_e$, the battery storage 150 is being charged by the generator 140. The computer 110 may be programmed, e.g., based on Equation (4), to determine the maximum discharge rate $d_{rmax}$. In yet another example, the charge time $t_e$ may be 0 (zero), i.e., the during entire performing of the actions no generator 140 operation is available, e.g., the vehicle 100 is an electric vehicle 100 and/or no operation of the generator 140 is permitted based on the identified MRC.

As discussed above, with reference to example $MRC_4$, restrictions may include restrictions on minimum available energy in a vehicle 100 battery 150 after performing the action(s) determined based on the identified $MRC_4$. For example, after completing vehicle 100 refueling, minimum available energy in the battery 150 is needed to restart the vehicle 100 engine, e.g., by actuating a vehicle 100 starter generator. The computer 110 may be programmed to determine the maximum permissible discharge rate $d_{rmax}$ further based on MRC restriction data specifying minimum available energy needed after performing the actions determined based on the identified MRC.

As discussed above, the computer 110 may be programmed to determine the load control plan based on the maximum permissible electrical energy discharge rate $d_{rmax}$ and a stored load priority table. The computer 110 may be programmed to determine a predicted engine idle time based on (i) the determined action and (ii) an idle time duration limit determined based on a vehicle 100 location. In some locations, e.g., based on local municipal restrictions, there may be limits on how long a vehicle 100 engine may operate while the vehicle 100 is idling. The computer 110 may be programmed to determine a local limitation for operating the vehicle 100 in idle mode based on received from a remote computer or stored map data including idle time duration limit data and the vehicle 100 location received from the vehicle 100 location sensor 130. For example, the computer 110 may be programmed to determine, based on the vehicle 100 location, a maximum idle time limit of 10 seconds. The computer 110 may receive map data including data specifying whether an idle time restriction exists in a location, and an idle time duration limit associated with each location. The computer 110 may be programmed to determine a charge time to of 10 seconds based on a determined idle time duration limit of 10 seconds for the vehicle 100 location.

Table 4 shows an example load priority table which specifies LOW, MED (medium), and HIGH priorities for each device based on a vehicle 100 mode of operation and a maximum permissible discharge rate $d_{rmax}$ specified in percentage. For example, upon determining an "engine off and devices on" mode of operation and a maximum discharge rate $d_{rmax}$ of 70%, the computer 110 may determine a control plan based on the priorities of column (v) of Table 4. Column (v) specifies the priorities of the devices based on engine idle mode of operation and a 70% discharge rate $d_{rmax}$. The instructions are determined based on the priorities such that a total discharge rate is less than the discharge rate $d_{rmax}$. Thus, the computer 110 may determine, based on the determined priorities, a control plan including an instruction to turn off the electrical devices of the vehicle 100 powertrain, interior light, daytime running light, etc., and an instruction to turn on (or maintain on) the power to the devices such as hazard light. The control plan may include partially turning off (i.e., limiting power supply) the devices pertaining to the airbag and brake controller.

TABLE 4

| | Mode of Operation | | | | | |
| | Engine Idle | | | Engine Off - Devices On | | |
| | rate $d_{rmax}$ | | | | | |
| | (i) | (ii) | (iii) | (iv) | (v) | (vi) |
| Device | 100% | 70% | 30% | 100% | 70% | 30% |
| Powertrain | HIGH | HIGH | HIGH | LOW | LOW | LOW |
| Airbag | HIGH | HIGH | HIGH | MED | MED | MED |
| Brake | HIGH | HIGH | HIGH | MED | MED | LOW |
| Interior light | HIGH | HIGH | HIGH | MED | LOW | LOW |
| Hazard light | HIGH | HIGH | HIGH | HIGH | HIGH | HIGH |
| Daytime lights | HIGH | HIGH | HIGH | MED | LOW | LOW |
| Sensors | HIGH | HIGH | HIGH | MED | LOW | LOW |
| Sensor cleaning | HIGH | HIGH | HIGH | MED | LOW | LOW |

In some examples, the priority table may lack a column matching the identified discharge rate $d_{rmax}$, e.g., 40%. In such an example, the computer 110 may be programmed to identify a column, e.g., column (vi), with a respective maximum discharge rate $d_{rmax}$, e.g., 30%, that is nearest to the identified discharge rate $d_{rmax}$ of 40%. Additionally or alternatively, other mathematical techniques such as interpolation may be used.

An amount of electrical energy consumed by vehicle 100 device at least partially depends on an ambient temperature $T_o$, i.e., a temperature of a device's environment. Thus, the outdoor or ambient temperature $T_o$ of the vehicle 100 may change a load status of vehicle 100 devices. Table 4 below shows an example set of relationships between a vehicle 100 load status L and an outdoor temperature $T_o$. For example, the vehicle 100 load L is 100% (i.e., at nominal load value) when outdoor temperature $T_o$ is 25 degrees Celsius and each vehicle 100 device is powered (turned on). The computer 110 may be programmed to determine the electrical load status L based on an outdoor temperature $T_o$ and the vehicle 100 mode of operation, and then to determine the load control plan further based on the determined electrical load status. In other words, a maximum discharge rate $d_{rmax}$ is determined based on a nominal load status L of 100%. However, the load status L may change based on the outside temperature $T_o$. Thus, the computer 110 may determine the control plan further based on the outside temperature $T_o$.

For example, with reference to Table 4, in an outside temperature $T_o$ of 10 degrees Celsius, the load status L for operation of whole vehicle 100 devices (i.e., full load) may be 90%. Upon determining a maximum discharge rate $d_{rmax}$ of 65%, the computer 110 may be programmed to determine the control plan based on an adjusted maximum discharge rate $d_{rmax}$ of 72% (i.e., 65×100 divided by 90).

TABLE 4

| Outdoor Temperature (Celsius) $T_o$ | Load status L (%) |
|---|---|
| 50 C. | 90% |
| 25 C. | 100% |
| 10 C. | 90% |
| 0 C. | 90% |
| −10 | 80% |
| −30 | 70% |

The vehicle 100 may include one or more thermal electrical devices. A thermal electrical device (or thermal device), in the present context, is an electrical device which heats or cools an area of the vehicle 100, e.g., interior heater, air-conditioner, a sensor 130 cooling device, etc. In one example, a thermal device in the vehicle 100 may operate to provide comfort for a vehicle 100 user, e.g., heating and/or cooling an interior of the vehicle 100. In another example, a thermal device such as a sensor 130 cooling device may operate to protect a sensor 130, e.g., a localization sensor 130, from being damaged by heat generated as a result of the sensor 130 operation.

The computer 110 may be programmed to determine a thermal load threshold for vehicle 100 thermal devices based on the outside temperature $T_o$, a vehicle interior temperature, a user interior temperature setting, a vehicle 100 sensor 130 temperature, and a specified range for an operation temperature of the vehicle sensor 130. The thermal threshold, in the present context, is a maximum electrical discharge rate $d_{rmax\_thermal}$ for vehicle 100 thermal devices. For example, the computer 110 may be programmed, based on Equation (5), to determine the thermal load threshold $d_{rmax\_thermal}$. $T_b$, $T_o$, $T_i$, $T_s$, $T_{set}$, and $R_s$, representing the battery temperature, the outside temperature, vehicle 100 interior temperature, a vehicle 100 sensor 130 temperature, a set temperature for the vehicle 100 interior, and a specified sensor 130 operation temperature range.

$$d_{rmax\_thermal} = f_4(T_b, T_o, T_i, T_s, T_{set}, R_s, \text{SOC}, t_{min}) \quad (5)$$

The vehicle 100 interior temperature $T_i$ may be determined based on data received from a vehicle 100 interior temperature sensor 130. The sensor 130 temperature, e.g., a localization sensor, a lidar sensor, etc., may be determined based on data received from the respective sensor 130.

The computer 110 may receive data including the set temperature $T_{set}$, e.g., 25 degrees Celsius, from a vehicle 100 user interface. In one example, a lidar sensor 130 may include a temperature sensor. A temperature range $R_s$, e.g., −20 C to 100 C, may be specified for a sensor 130. A temperature range $R_s$ may be specified based on physical characteristics of the sensor 130. A sensor 130 temperature outside the specified range may result in a lack of operation and/or a sensor 130 fault.

Operation $f_4$ may be specified using stored data, e.g., tables of data including relationships of operation $f_4$ inputs and the maximum electrical discharge rate $d_{rmax\_thermal}$. Additionally or alternatively, a battery 150 manufacturer, etc., may determine an equation specific to the battery 150 based on test data and/or analytical techniques. The maximum electrical discharge rate $d_{rmax\_thermal}$ may be (i) 20% when the sensor temperature $T_s$ is within the range $R_s$, and (ii) 50% when the sensor temperature but may be $T_s$ is above the maximum value of the range $R_s$, because cooling the sensor 130 may be necessary to prevent a fault of the sensor 130. Additionally or alternatively, the computer 110 may be programmed based on relationships including other inputs of the operation $f_4$ to determine the maximum electrical discharge rate $d_{rmax\_thermal}$.

Table 5 shows an example thermal load priority list including a set of relationships between the maximum electrical discharge $d_{rmax\_thermal}$, the vehicle 100 mode of operation, and the priority of each thermal device. For example, the computer 110 may determine a medium (MED) priority for sensor 130 cooling, and low priority for air-conditioner and interior heating upon determining a discharge rate $d_{rmax\_thermal}$ of 30% and the "engine off-devices on" mode of operation.

The computer 110 may be programmed to determine a second power control plan for the vehicle 100 thermal devices based on a thermal load priority list, e.g., Table 5, and the maximum electrical discharge rate $d_{rmax\_thermal}$.

TABLE 5

| | Mode of Operation | | | | | |
|---|---|---|---|---|---|---|
| | Engine Off - Devices On | | | Engine Idle | | |
| | $d_{rmax\_thermal}$ | | | | | |
| Device | 100% | 70% | 30% | 100% | 70% | 30% |
| Sensor cooling | MED | MED | MED | HIGH | HIGH | MED |
| Air conditioner | LOW | LOW | LOW | HIGH | LOW | LOW |
| Interior heating | MED | LOW | LOW | MED | LOW | LOW |

Processing

Figure 3A:
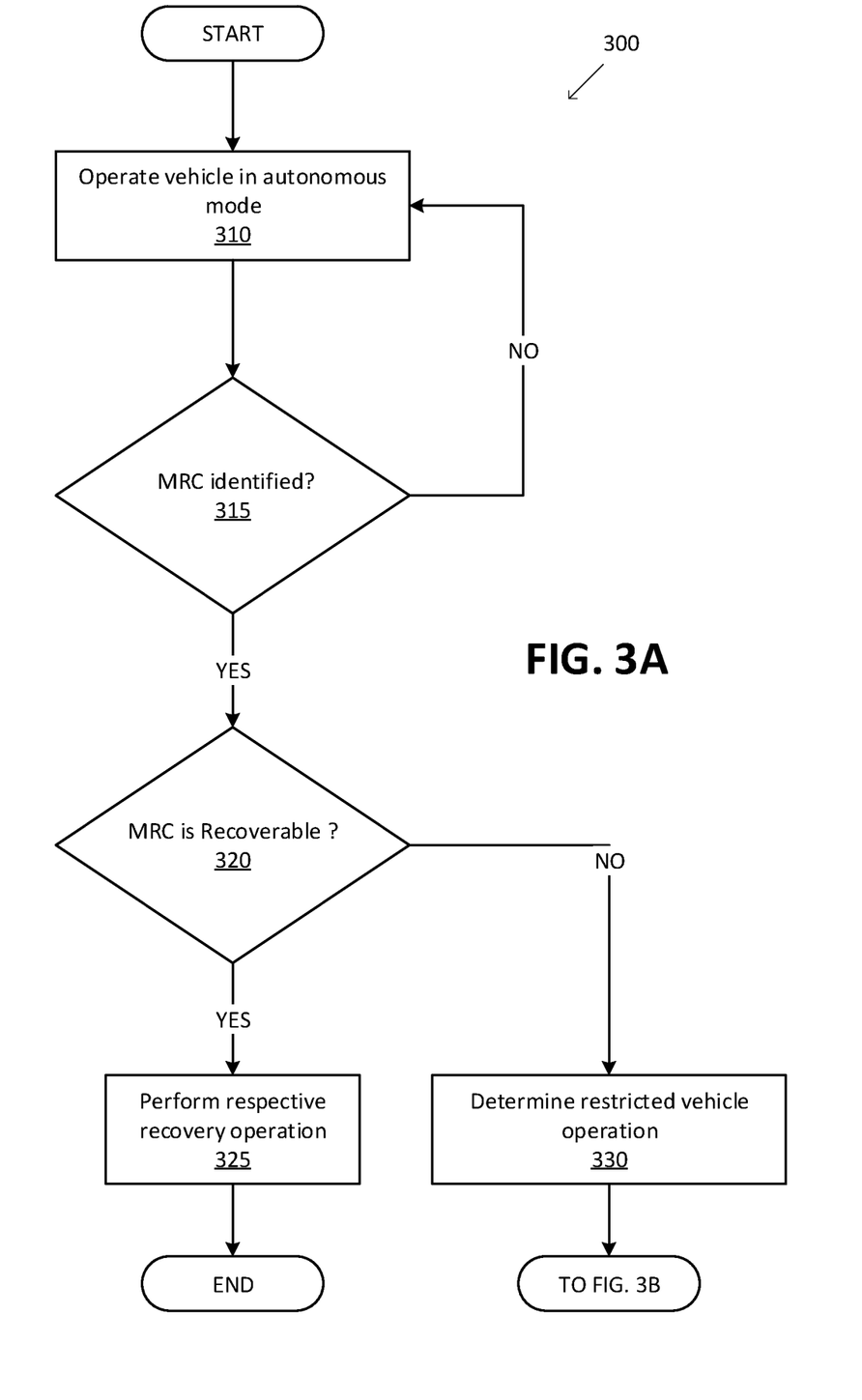
FIGS. 3A-3B are a flowchart of an exemplary process for controlling vehicle operation.
Figure 3B:
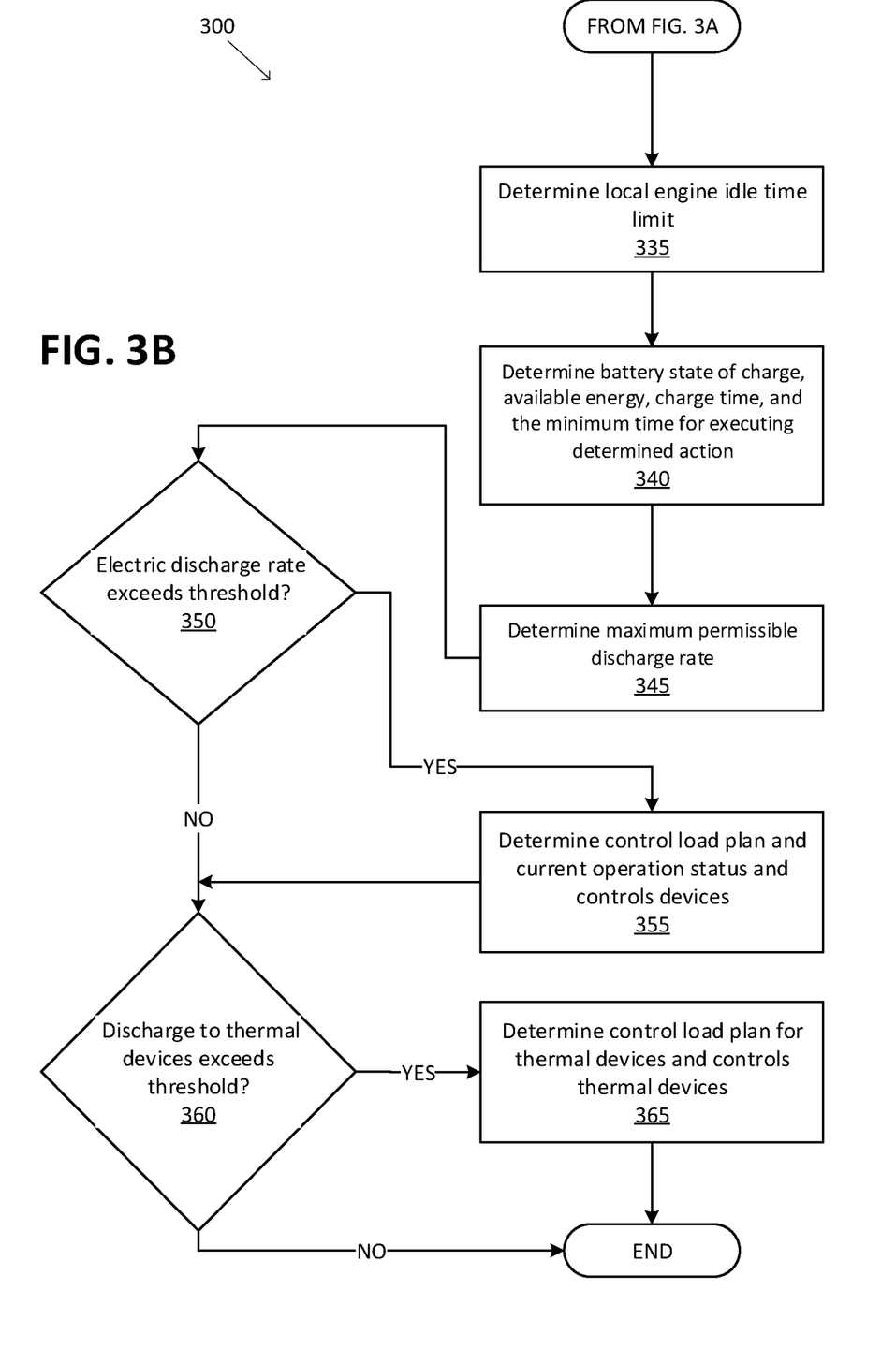

FIGS. 3A-3B show a flowchart of an exemplary process 300 for controlling vehicle 100 operation. The computer 110 may be programmed to execute blocks of the process 300. Alternatively, a plurality of computers 110 of the vehicle 100 may be programmed to execute the blocks of the process 300. For example, each of the plurality of the computers 110 may execute one or more blocks of the process 300.

With reference to FIG. 3A, the process 300 begins in a block 310, in which the computer 110 operates the vehicle 100 in an autonomous mode or semi-autonomous mode, e.g., levels 3, 4, and 5 of driving automation as specified by SAE (Society of Automotive Engineers). The computer 110 may operate the vehicle 100 in any one of the vehicle 100 modes of operation, e.g., moving (controlling vehicle 100 propulsion, braking, and steering), idle, engine off and electrical devices on, fueling, etc. To operate the vehicle 100, the computer 110 may be programmed to receive vehicle 100 data including sensor 130 data, diagnostic data, vehicle 100 mode of operation, etc.

Next, in a decision block 315, the computer 110 determines whether an MRC is identified. The computer 110 may be programmed to identify an MRC, e.g., Table 2, based on vehicle 100 sensor 130 data, diagnostic data, etc. If the computer 110 determines an MRC, then the process 300 returns to the block 310; otherwise the process 300 proceeds to a decision block 320.

In the decision block 320, the computer 110 determines whether the identified MRC is recoverable. For example, an MRC that resulted from a dirty sensor is considered recoverable, whereas an MRC resulted from a power supply fault, a braking fault, etc. may be determined to be unrecoverable. If the computer 110 determined that the identified MRC is recoverable, then the process 300 proceeds to a block 325; otherwise the process 300 proceeds to a block 330.

In the block 325, the computer 110 performs an action based on the recoverable MRC. For example, upon identifying a recoverable MRC based on a dirty sensor 130, the computer 110 may be programmed to actuate a sprayer actuator 120 to spray the dirty sensor 130. Additionally, the computer 110 may be programmed to stop the vehicle 100 on a road shoulder during spraying the sensor 130. Following the block 325, the process 300 ends, or alternatively returns to the block 310, although not shown in FIG. 3A.

In the block 330, the computer 110 may be programmed to determine a restricted operation of the vehicle 100 based on the identified MRC. For example, as shown in example Table 2, the computer 110 may be programmed to determine the restricted vehicle 100 operation based on the MRC and current vehicle 100 mode of operation. In one example, a restricted operation may include reducing electrical load to ensure battery 150 operation for a minimum time $t_{min}$ of at least 4 minutes to upload diagnostic data. In another example, restricted operation may include reducing load on battery 150 during refueling the vehicle 100 such that available power Pa after refueling is sufficient to restart the engine.

Continuing with reference to FIG. 3B, next, in a block 335, the computer 110 determines engine idle time duration limit. For example, the computer 110 may determine an engine idle time duration limit of 10 seconds based on map data and data received from the vehicle 100 GPS sensor 130.

Next, in a block 340, the computer 110 determines the battery 150 state of charge SOC, available energy $P_a$, charge time $t_e$, and the minimum time $t_{min}$ for executing determined action. The computer 110 may be programmed to determine the state of charge SOC and available energy $P_a$ based on battery 150 sensor 130 data. The computer 110 may be programmed to determine the charge time $t_e$ based at least in part on engine idle time duration limit, e.g., with reference to the graph 200 of FIG. 2. The computer 110 may be programmed to determine the minimum time $t_{min}$ based on the identified MRC (Table 2).

Next, in a block 345, the computer 110 determines a maximum permissible discharge rate $d_{rmax}$. The computer 110 may be programmed, in accordance with example Equation (4), to determine the maximum permissible discharge rate $d_{rmax}$ based on the state of charge SOC, battery temperature $T_b$, charge time $t_e$, minimum time $t_{min}$. The computer 110 may be programmed to adjust the maximum permissible discharge rate $d_{rmax}$ based on the outside temperature $T_o$.

Next, in a decision block 350, the computer 110 determines whether the electrical discharge rate of the vehicle 100 for electrical devices exceeds a specified threshold (the discharge rate $d_{rmax}$). The computer 110 may be programmed to determine the actual discharge rate for electrical devices of the vehicle 100, e.g., based on data received from battery sensor 130, a current sensor 130, etc. If the computer 110 determines that the electrical discharge rate (or load L) of the vehicle 100 exceeds the discharge rate $d_{rmax}$, then the process 300 proceeds to a block 355; otherwise the process 300 proceeds to a decision block 360.

In the block 355, the computer 110 determines an electric load control plan based on the vehicle 100 mode of operation, the determined discharge rate $d_{rmax}$, and a load priority table. The computer 110 may be programmed to determine a priority of each electrical device based on a load priority table, e.g., Table 4. The load priority table may be stored in the computer 110 memory. The computer 110 may be programmed to determine, based on the determined control load plan whether to turn off a device, keep the device turned on, or adjust an amount of energy supplied to the device, e.g., by partially turning off the device. The computer 110 then actuates one or more vehicle 100 actuators 120 based on the determined electric load plan. For example, the computer 110 may be programmed to actuate a switch to turn off or on. The computer 110 may send a message via a vehicle 100 network to an electrical device including a maximum energy consumption limit for the respective device.

In the decision block 360, which can be reached from either of the decision blocks 350 or the block 355, the computer 110 determines whether a discharge rate of electrical energy to the thermal devices exceeds a second threshold; a maximum discharge rate $d_{rmax\_thermal}$ for the thermal devices. The computer 110 may be programmed to determine the maximum discharge rate $d_{rmax\_thermal}$ for the thermal devices based on Equation (5). The computer 110 may be programmed to determine an actual discharge rate of thermal devices based on data received from the vehicle 100 sensors 130 and/or data stored in computer 110 memory specifying energy consumption of each thermal device. If the computer 110 determines that the discharge rate to the thermal devices exceeds the maximum discharge rate $d_{rmax\_thermal}$ for the thermal devices, then the process 300 proceeds to a block 365; otherwise the process 300 ends, or alternatively returns to the block 310, although not shown in FIGS. 3A-3B.

In the block 365, the computer 110 determines a control load plan for thermal devices based on the on the vehicle 100 mode of operation, the determined discharge rate $d_{rmax\_thermal}$ for thermal devices, and a load priority table for thermal devices, e.g., Table 5. For example, the control plan may include an instruction to turn off the air-conditioner while maintaining the electric power supply to the sensor cleaning devices. The computer 110 may be programmed to actuate one or more vehicle 100 actuators 120 based on the determined control plan for thermal devices, e.g., by actuating the air-conditioner to turn off and maintaining the power supply to the sensor 130 cleaning devices. Following the block 365 the process 300 ends, or alternatively returns to the block 310, although not shown in FIGS. 3A-3B.

Unless indicated explicitly to the contrary, "based on" means "based at least in part on" and/or "based entirely on."

Computing devices as discussed herein generally each includes instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH, an EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A system, comprising a processor and a memory, the memory storing instructions executable by the processor to:
   while a propulsion is activated and operating, determine an action for a vehicle based on an identified risk condition that specifies one or more restrictions on one or more vehicle operations in accordance with one or more of a plurality of fault conditions;
   determine a minimum time for performing the action;
   based on data including a vehicle battery state of charge, an outdoor temperature, and a vehicle mode of operation selected from a plurality of possible modes of operation while the propulsion is activated and operating, determine an available electrical power for performing the action;
   based minimum time for performing the action and the determined available electrical power while the propulsion is activated and operating, determine maximum permissible electrical energy discharge rate;
   based on the maximum permissible electrical energy discharge rate while the propulsion is activated and operating, an electrical load status of the vehicle, and load priority data, determine a load control plan for a plurality of electrical devices in the vehicle; and
   execute the determined load control plan.

2. The system of claim 1, wherein the instructions further include instructions to:
   determine the electrical load status based on the outdoor temperature and the vehicle mode of operation; and
   determine the load control plan further based on the determined electrical load status.

3. The system of claim 1, wherein the risk condition specifies a plurality of restrictions on one or more of vehicle operations in accordance to one or more of fault conditions.

4. The system of claim 1, wherein the instructions include further instructions to determine the risk condition based at least in part on a plurality of relationships between (i) the risk condition, and (ii) DTCs and a vehicle diagnostic condition.

5. The system of claim 1, wherein the instructions further include instructions to determine a predicted engine idle time based on (i) the determined action and (ii) an idle time duration limit determined based on a vehicle location and map data.

6. The system of claim 1, wherein the determined action includes at least one of uploading vehicle data to a remote computer or downloading data from the remote computer, navigating the vehicle to a specified location, actuating a vehicle actuator to perform a specified action.

7. The system of claim 1, wherein the instructions further include instructions to determine the minimum time based on the determined action and stored execution time data for the determined action.

8. The system of claim 1, wherein the load control plan includes (i) turning off a device, (ii) reducing power provided to the device, or (iii) transmitting an instruction via a vehicle communication network to the device including maximum allowed power limit of the respective device, wherein the device includes a computer programmed to execute the received instruction to limit a respective power consumption.

9. The system of claim 1, wherein the instructions further include instructions to determine a thermal load threshold for vehicle thermal devices based on the outside temperature, a vehicle interior temperature, a user interior temperature setting, a vehicle sensor temperature, and a specified range for an operation temperature of the vehicle sensor.

10. The system of claim 9, wherein the instructions further include instructions to determine a second power control plan for the vehicle thermal devices based on a thermal load priority list and a second threshold for the vehicle thermal devices.

11. The system of claim 1, wherein the instructions further include instructions to determine a respective priority for each of the plurality of devices based on the load priority data, the vehicle model of operation, and the determined maximum permissible electrical energy discharge rate, and determine the load control plan further based on the respective priorities determined for each of the plurality of devices.

12. A method, comprising:
    while a propulsion is activated and operating, determining an action for a vehicle based on an identified risk condition that specifies one or more restrictions on one or more vehicle operations in accordance with one or more of a plurality of fault conditions;
    determining a minimum time for performing the action;
    based on data including a vehicle battery state of charge, an outdoor temperature, and a vehicle mode of operation selected from a plurality of possible modes of operation while the propulsion is activated and operating, determining an available electrical power for performing the action;
    based on the minimum time for performing the action and the determined available electrical power while the propulsion is activated and operating, determining maximum permissible electrical energy discharge rate;
    based on the maximum permissible electrical energy discharge rate while the propulsion is activated and operating, an electrical load status of the vehicle, and load priority data, determining a load control plan for a plurality of electrical devices in the vehicle; and
    executing the determined load control plan.

13. The method of claim 12, further comprising:
    determining the electrical load status based on the outdoor temperature and the vehicle mode of operation; and
    determining the load control plan further based on the determined electrical load status.

14. The method of claim 12, further comprising determining the risk condition based at least in part on a plurality of relationships between (i) the risk condition, and (ii) DTCs and a vehicle diagnostic condition.

15. The method of claim 12, further comprising determining a predicted engine idle time based on (i) the determined action and (ii) an idle time duration limit determined based on a vehicle location and map data.

16. The method of claim 12, wherein the determined action includes at least one of uploading vehicle data to a remote computer or downloading data from the remote computer, navigating the vehicle to a specified location, or actuating a vehicle actuator to perform a specified action.

17. The method of claim 12, further comprising determining the minimum time based on the determined action and stored execution time data for the determined action.

18. The method of claim 12, wherein the load control plan includes (i) turning off a device, (ii) reducing power provided to the device, or (iii) transmitting an instruction via a vehicle communication network to the device including maximum allowed power limit of the respective device, further comprising executing, in the device, the received instruction to limit a respective power consumption.

19. The method of claim 12, further comprising determining a thermal load threshold for vehicle thermal devices based on the outside temperature, a vehicle interior temperature, a user interior temperature setting, a vehicle sensor temperature, and a specified range for an operation temperature of the vehicle sensor.

20. The method of claim 12, further comprising determining a second power control plan for the vehicle thermal devices based on a thermal load priority list and a second threshold for the vehicle thermal devices.

* * * * *